United States Patent
Suzuki

(10) Patent No.: US 9,798,869 B2
(45) Date of Patent: Oct. 24, 2017

(54) PROCESSING APPARATUS, METHOD FOR CONTROLLING PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Takeshi Suzuki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 14/744,380

(22) Filed: Jun. 19, 2015

(65) Prior Publication Data

US 2016/0004851 A1 Jan. 7, 2016

(30) Foreign Application Priority Data

Jul. 3, 2014 (JP) .................. 2014-138018

(51) Int. Cl.
| | | |
|---|---|---|
| G06F 21/31 | (2013.01) | |
| G06F 21/32 | (2013.01) | |
| G06F 21/35 | (2013.01) | |
| G06F 21/30 | (2013.01) | |
| G06F 21/60 | (2013.01) | |

(52) U.S. Cl.
CPC ............ *G06F 21/31* (2013.01); *G06F 21/608* (2013.01); *G06F 21/30* (2013.01); *G06F 21/305* (2013.01); *G06F 21/32* (2013.01); *G06F 21/35* (2013.01); *G06F 21/60* (2013.01)

(58) Field of Classification Search
CPC ........ G06F 21/30; G06F 21/305; G06F 21/32; G06F 21/35; G06F 21/60; G06F 21/608; G06F 21/31
See application file for complete search history.

(56) References Cited

U.S. PATENT DOCUMENTS

| | | | |
|---|---|---|---|
| 7,327,478 B2 | 2/2008 | Matsuda | |
| 2002/0122203 A1* | 9/2002 | Matsuda | H04N 1/00204 358/1.15 |
| 2003/0014505 A1* | 1/2003 | Ramberg | G06F 11/0709 709/223 |
| 2013/0141753 A1* | 6/2013 | Kamoi | G06F 3/1231 358/1.14 |

FOREIGN PATENT DOCUMENTS

JP 2002-359718 A 12/2002

* cited by examiner

*Primary Examiner* — Robert Leung
*Assistant Examiner* — Ayoub Alata
(74) *Attorney, Agent, or Firm* — Fitzpatrick, Cella, Harper & Scinto

(57) ABSTRACT

Provided is a processing apparatus that authenticates a requestor in response to a request for performing predetermined processing. The processing apparatus executes the predetermined processing upon the authentication succeeding. Whether or not authentication is performed is set individually for each of the processing apparatus and an external apparatus of the processing apparatus that serve as the requestor. The authentication is performed in the case where authentication is set to be performed on the requestor that made the request.

20 Claims, 9 Drawing Sheets

PROCESSING APPARATUS, METHOD FOR CONTROLLING PROCESSING APPARATUS, AND NON-TRANSITORY COMPUTER-READABLE STORAGE MEDIUM

BACKGROUND OF THE INVENTION

Field of the Invention

The present invention relates to a processing apparatus that performs predetermined processing.

Description of the Related Art

Multifunction peripherals ("MFPs" hereinafter) having a printer, a scanner, a card slot, a facsimile function, and network functionality have become widespread in recent years. An MFP has a web server function realized as a remote function utilized over a network, and upon being accessed from a browser running on an information processing apparatus connected to the MFP over the network, the MFP can display content on the browser. Examples of content in an MFP include web service settings for displaying a printer state such as ink information, for inputting LAN settings or personal information, and the like. Here, there are cases where no password authentication is performed when accessing the web server from the browser. In this case, there is the risk that the password of an access point (AP) accessed from remote locations and to which the MFP is connected, personal information input for a web service, and the like are stolen or manipulated by a third party, for example. Such MFPs that are not protected by password authentication are vulnerable in terms of information security. It is therefore recommended that password authentication is enabled as a setting for an initial state (a state before shipping, a state after an initialization/reset operation is carried out through a main body user interface (UI) of the MFP, or the like).

One local function of the main body UI of an MFP is an administrator password function, which requests password authentication when various types of settings in the MFP are changed. The various types of settings in an MFP include, for example, LAN settings, facsimile settings, language settings, web service settings, main body basic settings, and the like. Typical users who do not know the password cannot change the various types of settings of the MFP, and only the administrator who knows the password can change the various types of settings of the MFP. In the case where no one other than the administrator is to be allowed to change the various types of settings, a method that enables the administrator password function so that only the administrator is allowed to configure various types of settings can be employed.

On the other hand, in the case where all users are to be allowed to change various types of settings, a method that disables the administrator password function so that all users are allowed to change various types of settings can be employed. Because the main body UI of an MFP ordinarily has a small screen and thus has poor operability, inputting a password on the main body UI and performing authentication may be difficult for users unfamiliar with the operation. Accordingly, whether or not to use the administrator password function is determined by the administrator based on a user's method of usage. In the case where the administrator password function is enabled, a problem in usability will arise for users who do not need the administrator password function, and thus it is recommended that the administrator password function be disabled in the initial state.

As described above, MFPs use passwords at a variety of locations, such as when accessing a web server that serves as one of the remote functions and when changing various types of settings that serves as one of the local functions, and settings recommended for the initial state differ from usage location to usage location.

Meanwhile, Japanese Patent Laid-Open No. 2002-359718 discloses carrying out an authentication process for a remote function (a remote UI) in which operations are performed through an apparatus such as a PC that is connected to an MFP and for a local function (a main body UI, a card reader, or the like) in which operations are performed through the main body of the MFP.

In Japanese Patent Laid-Open No. 2002-359718, the authentication process is always performed, both when accessing the remote function (the remote UI) and when accessing the local function (the main body UI, the card reader, or the like). Therefore, it is necessary to perform the authentication process for both types of access, and it is not possible to perform control such that the authentication process is applied to only one type of access and is not applied to the other type of access.

SUMMARY OF THE INVENTION

The present invention was made in view of the above-described problem, and provides a technique that makes it possible to perform appropriate and efficient authentication processing.

According to the first aspect of the present invention, there is provided a processing apparatus that performs predetermined processing, the apparatus comprising: an authentication unit configured to authenticate, in response to a request for performing the predetermined processing, a requestor that made the request; a performing unit configured to perform the predetermined processing upon the authentication performed by the authentication unit succeeding; and a setting unit configured to set whether or not the authentication unit is to perform the authentication individually for each of the processing apparatus and an external apparatus of the processing apparatus that serve as the requestor, wherein the authentication unit performs the authentication in the case where the setting unit has set the authentication to be performed on the requestor that made the request.

According to the second aspect of the present invention, there is provided a method for controlling a processing apparatus that performs predetermined processing, the method comprising: a setting step of individually setting, for each of the processing apparatus and an external apparatus of the processing apparatus that each serve as a requestor that made a request for performing the predetermined processing, whether or not to perform authentication for the performance; an authentication step of authenticating the requestor that made the request for performing the predetermined processing, in the case where the authentication has been set in the setting step to be performed on the requestor; and a performing step of performing the predetermined processing upon the authentication of the authentication step succeeding.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the drawings.

Embodiment 1

Figure 1:
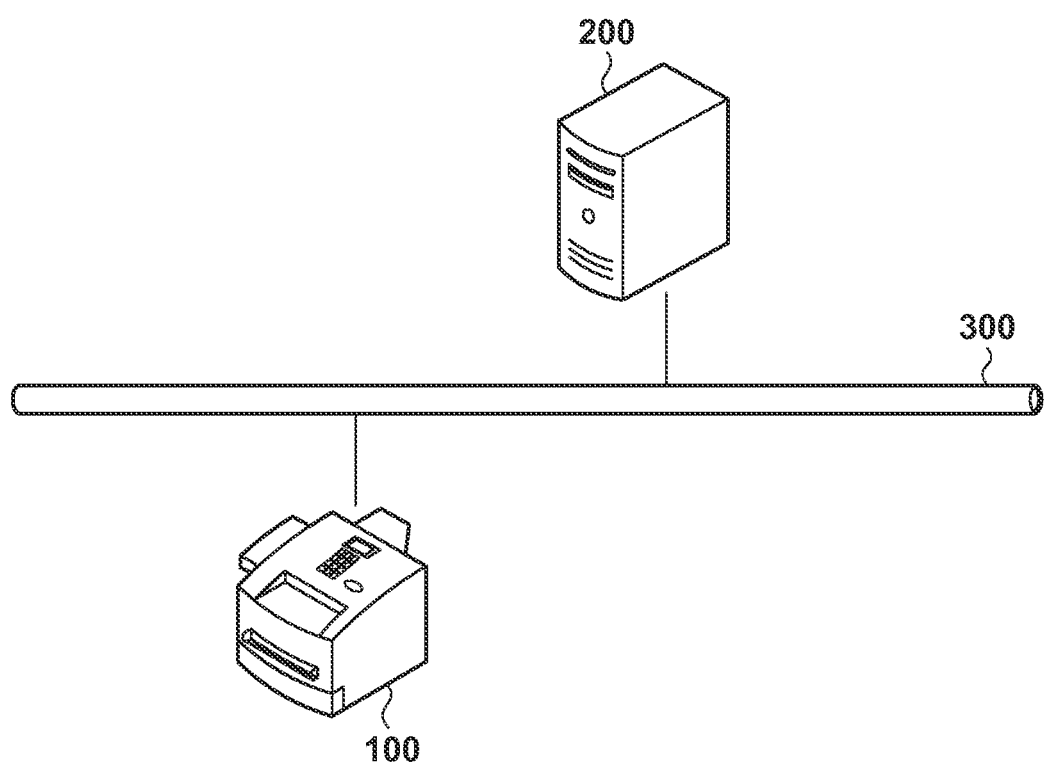
FIG. 1 is a diagram illustrating an example of a configuration of an image processing system.

FIG. 1 is a diagram showing the overall configuration of an image processing system. The image processing system is constituted by an MFP 100 and a personal computer (PC) 200 that are connected to each other over a communication network 300 corresponding to the Internet, an Intranet, or the like.

By accessing a web server running on the MFP 100, which is an image processing apparatus, from a web browser (web client) running on the PC 200, which is an information processing apparatus, a user can utilize a remote function of the MFP 100 from the PC 200. Here, "remote function" refers to a function that allows execution of functions of the MFP 100 or configuration of settings regarding the functions from a place (external apparatus) located away from the MFP 100, such as a remote UI or a network tool, which will be described later. On the other hand, "local function" refers to a function that allows execution of functions of the MFP 100 or configuration of settings regarding the functions via a main body UI (a display/operation portion 108 of the MFP 100), which will be described later. Note that information such as image data for a setting screen of the remote UI is provided by the MFP 100. That is, the display screen that is displayed as the remote UI in the PC 200 is provided by the MFP 100, and the user can make instructions through this display screen.

The following describes a method in which communication between the MFP 100 and the PC 200 is controlled through HTTP, but it is assumed that any known method can be used for the control protocol. Furthermore, although the PC 200 is used in the descriptions, the invention is not limited to a PC, and any electronic device that has a web browser can be used. For example, a device having a web browser, such as a smartphone, a tablet, or a digital television, may be used.

Figure 2:
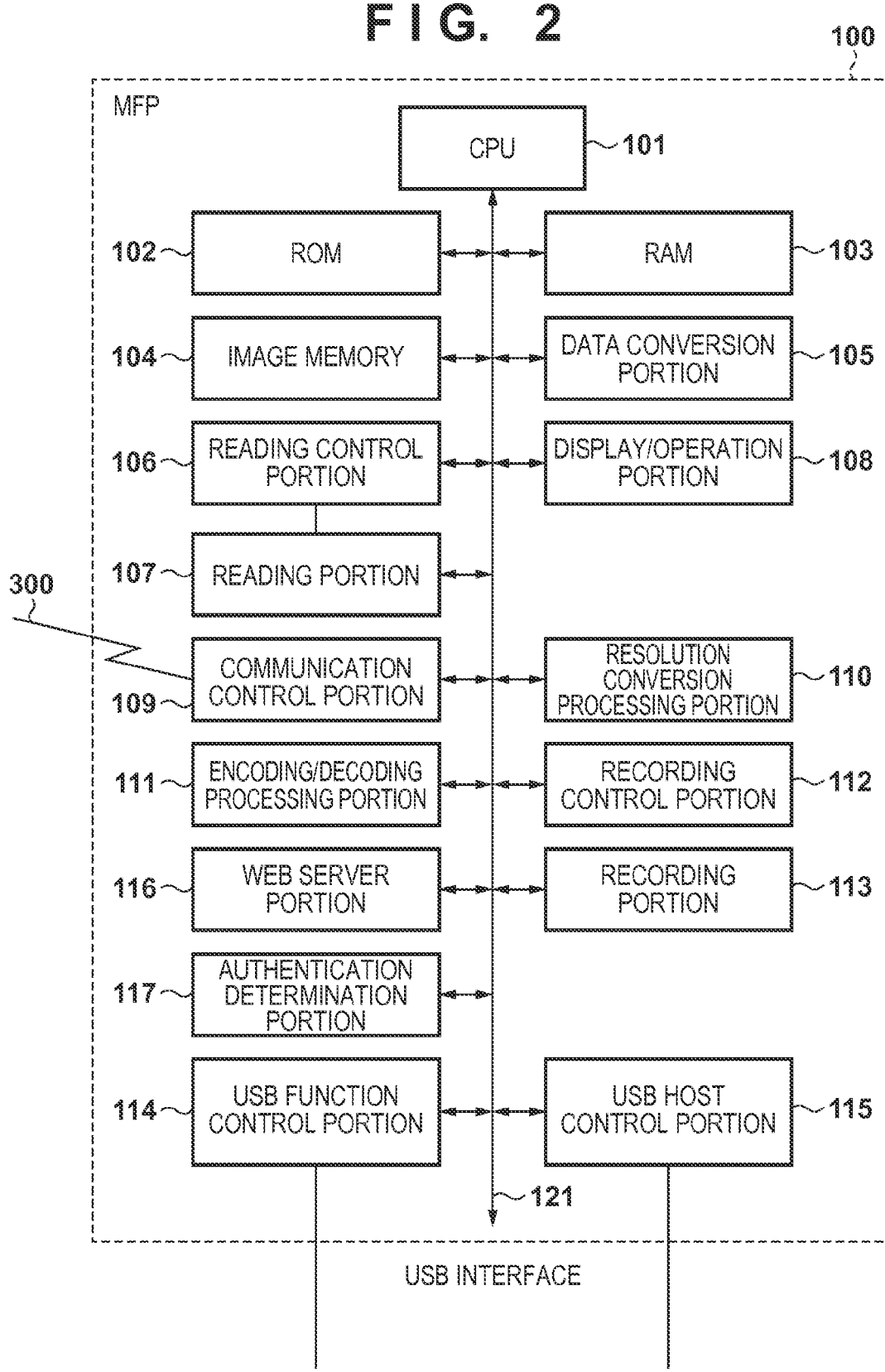
FIG. 2 is a functional block diagram illustrating a schematic configuration of an MFP 100.

FIG. 2 is a block diagram showing a schematic configuration of the MFP 100. In the MFP 100, a CPU 101 is a system control portion and controls the MFP 100 as a whole. A ROM 102 stores fixed data such as a control program, a data table, and an embedded operating system (OS) program that are executed by the CPU 101. In the present embodiment, the control programs stored in the ROM 102 perform software execution control such as scheduling, task switching, interrupt processing, and so on under the control of the embedded OS stored in the ROM 102. Image data for a UI screen that is provided to the PC 200 for the remote UI and the like are also stored in the ROM 102. The remote UI is provided to the PC 200 by the CPU 101 transmitting the image data stored in the ROM 102 to the PC 200 in response to access from the web browser of the PC 200. That is, the display screen that is displayed as the remote UI on the PC 200 is provided by the MFP 100, and a user can make instructions through this display screen.

A RAM 103 is constituted by a static random access memory (SRAM) that requires a back-up power supply and the like, and data is stored therein using a primary cell (not shown) for data backup. Program control variables and the like whose data is not to be deleted are stored in the RAM 103. Furthermore, the RAM 103 also includes a memory area that stores setting values registered by a user, such as a password, a password coverage range, and a setting of whether an administrator password function is enabled or disabled, as well as management data and the like of the MFP 100.

An image memory 104 is constituted by a dynamic random access memory (DRAM) or the like, and stores image data. A partial area thereof is used as a work area in which software processing is executed. A data conversion portion 105 performs image data conversion by analyzing page description language (PDL) or the like, expanding computer graphics (CG) of character data, and so on.

Note that a password and a password coverage range, which will be described later, are stored in the ROM 102, which is a non-volatile memory. The password and the password coverage range are loaded into the RAM 103 when a power button of the MFP 100 is pressed to start the MFP 100 or when AC power is supplied thereto. Furthermore, if the password or the password coverage range is set or changed, a new password or password coverage range will be stored in the RAM 103. Then, the new password or password coverage range is stored in the ROM 102 when the power button of the MFP 100 is pressed to turn the MFP 100 off.

A reading control portion 106 controls a reading portion 107 to optically read a document using, for example, a CIS image sensor. Then, the reading control portion 106 subjects image signals obtained by converting the document into electrical image data to various types of image processing, such as binarization processing or halftone processing, using an image processing control portion (not shown), and outputs high-resolution image data. Note that the reading control portion 106 and the reading portion 107 may employ any one of the following two control methods. The first method is a sheet reading control method in which a document is read by a fixed CIS image sensor while the document is being conveyed. The second method is a book reading control method in which a document fixed on a document plate is scanned by a moving CIS image sensor.

A display/operation portion 108 includes operation keys, such as numerical value input keys, a mode setting key, an OK key, and a cancel key, and a display portion such as a light emitting diode (LED) or a liquid crystal display (LCD), and a user can use the display/operation portion 108 to launch various types of functions as a multifunction peripheral or to configure various types of settings. Furthermore, a user can use the display/operation portion 108 to set a password or a password coverage range, or set whether the administrator password function is enabled or disabled. The display/operation portion 108 further includes a password input portion, through which a user can input a password. However, since the display/operation portion 108 has a small screen and thus poor operability, inputting a password may be difficult for users unfamiliar with the operation.

A communication control portion 109 is connected to the communication network 300, so as to connect to an Internet provider, exchange data, image information, or the like with the PC 200, and so on. Note that a known method such as HTTP is assumed to be used for the connection to the communication network 300, and thus descriptions thereof will be omitted. A resolution conversion processing portion 110 performs resolution conversion control such as conversion of image data between different unit systems (for example, image data in millimeter units and image data in inch units). Note that the resolution conversion processing portion 110 can also perform scaling processing on image data.

An encoding/decoding processing portion 111 performs encoding/decoding processing or scaling processing between types of image data (uncompressed image data, MH, MR, MMR, JBIG, JPEG, or the like) that are handled by the MFP 100. A recording control portion 112 subjects image data that is to be printed to various types of image processing, such as smoothing processing, recording darkness correction processing, or color correction, via an image processing control portion (not shown), so as to convert the image data into high-resolution image data, and outputs the high-resolution image data to a recording portion 113. Furthermore, the recording control portion 112 also periodically acquires status information data of a recording portion 113 by controlling a USB host control portion 115.

The recording portion 113 is a recording portion constituted by a laser printer or an inkjet printer, and the like, and prints color image data or monochrome image data that is generated by the recording control portion 112 onto a printing member. A USB function control portion 114 controls communication carried out via a USB interface, and performs protocol control in compliance with the USB communication standard. The USB function control portion 114 converts data from USB function control tasks executed by the CPU 101 into packets, and transmits USB packets to an external PC. The USB function control portion 114 can also convert USB packets from an external PC into data and transmit the data to the CPU 101. A USB host control portion 115 is a control portion for performing communication using a protocol defined by the USB communication standard. The USB communication standard is a standard with which high-speed two-way data communication can be performed and with which a plurality of hubs or functions (slaves) can be connected to a single host (master). The USB host control portion 115 functions as the host in USB communication.

A web server portion 116 has a web server function, and provides the remote function to a web browser operating on the PC 200 via the communication control portion 109. Furthermore, the web server portion 116 has a password input function, and provides a function for a user to input a password. Furthermore, the web browser operating on the PC 200 has a larger screen and a higher operability than the display/operation portion 108, and thus it is easy even for users unfamiliar with the operation to input a password.

An authentication determination portion 117 performs password authentication in which a password input by a user using a password input portion included in the display/operation portion 108 is verified as matching the password that is stored in the ROM 102 and expanded on the RAM 103. Furthermore, the authentication determination portion 117 performs password authentication in which a password input by a user using the password input portion included in the web server portion 116 is verified as matching the password stored in the RAM 103. Furthermore, password authentication is performed in which a password input through a network tool (described later) operating on the PC 200 when the MFP 100 was accessed by the network tool is verified as matching the password stored in the RAM 103.

These various types of constituent components (101 to 106 and 108 to 117) are connected to each other via a CPU bus 121 managed by the CPU 101.

With respect to password authentication, if the web server portion 116 is not protected with password authentication, there is the risk that a password of an intermediary device (for example, an access point (AP)) that is accessed from remote locations and to which the MFP 100 is connected, personal information, or the like is read by a third party. Therefore, in view of this, it is recommended that password authentication be enabled as a setting for the initial state of the MFP 100. In this context, the initial state of the MFP 100 refers to the state of the MFP 100 before shipping, the state after an operation for initializing/resetting the MFP that is executable from the display/operation portion 108, or the like. However, with respect to inputting a password, it is difficult for a user who is unfamiliar with the operation to input a password since the display/operation portion 108 has a small screen and poor operability, and thus has poor usability. Therefore, it is recommended that password authentication be disabled as the setting for the initial state. As described above, the MFP 100 uses passwords at a plurality of sites and in a plurality of situations/modes, and thus settings recommended for the initial state are different depending on the usage locations/usage situations/usage modes.

Figure 3:
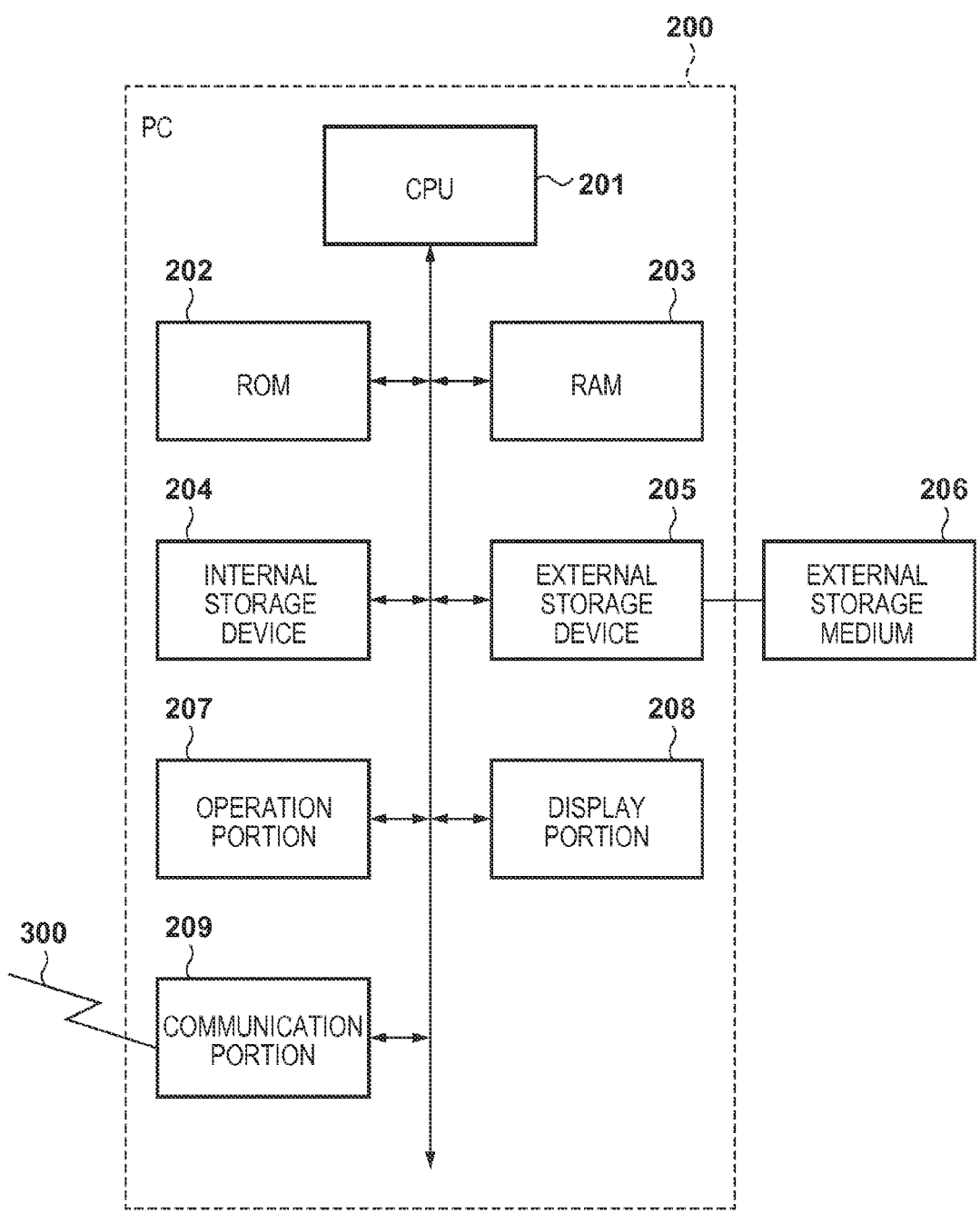
FIG. 3 is a functional block diagram illustrating a schematic configuration of a PC 200.

FIG. 3 is a block diagram showing a schematic configuration of the PC 200. A CPU 201 controls overall operations of the PC 200 via a system bus, in accordance with a program read out from a ROM 202, a RAM 203, or an internal storage device 204, or a program read out by an external storage device 205 from an external storage medium 206. The ROM 202 has stored therein programs such as a control program of the CPU 201 and the like. The RAM 203 temporarily stores programs and data such as image data.

An operating system, various types of application programs, and data such as image data are stored in the internal storage device 204. Furthermore, the web browser, which is application software for using the remote function of the MFP 100, is assumed to be installed in the internal storage device 204. By accessing the web server portion 116 to acquire a web page, the web browser can operate as the remote UI, making the operation of the MFP 100 from the web browser possible. Furthermore, the network tool, which is application software for accessing the MFP 100 via a network so as to enable the changing various types of settings of the functions of the MFP 100, is assumed to be installed in the internal storage device 204. Ordinarily, these types of application software are installed by the PC 200 receiving data from the external storage medium 206 (such as a CD/DVD medium), which is another computer-readable medium, in which these types of application software are stored and controlling the external storage device 205.

An operation portion 207 is a keyboard, a mouse, and the like (not shown) that serve as input portions for inputting instructions from a user. A display portion 208 is a display device that performs various types of display for a user. Note that the operation portion 207 and the display portion 208 may be included in the PC 200, or an external operation device and an external display device that serve as the operation portion 207 and the display portion 208 may be connected to the PC 200. A communication portion 209 is connected to the communication network 300, so as to connect to an Internet provider, exchange data, image information, and the like with the MFP 100, and so on. Note that a known method such as HTTP or XMPP is assumed to be used for the connection to the communication network 300, and thus descriptions thereof will be omitted.

Figure 4:
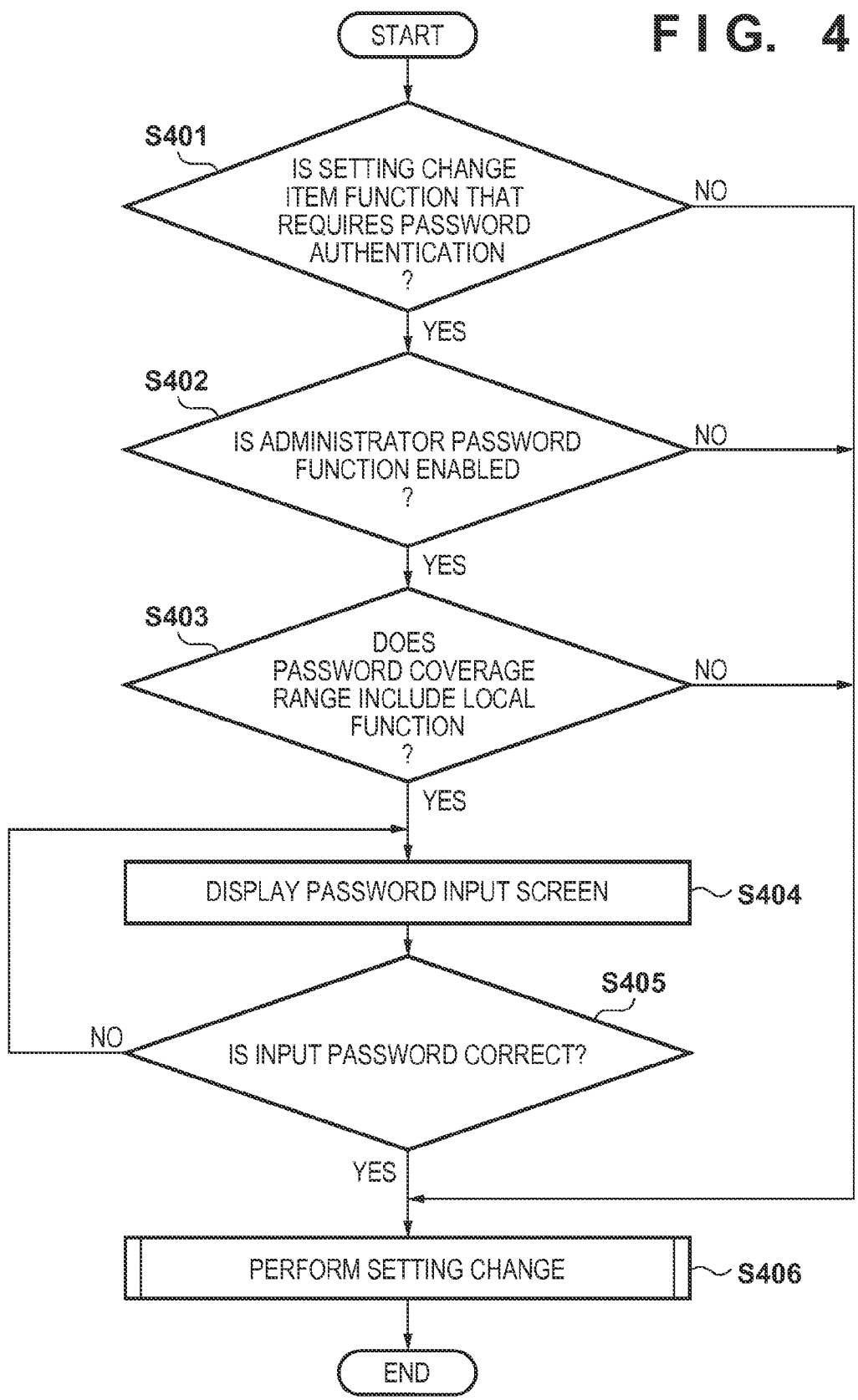
FIG. 4 is a flowchart illustrating operations in which settings for various types of functions are changed using a main body UI of the MFP 100.

FIG. 4 is a flowchart illustrating operations in which settings of various types of functions are changed through the main body UI of the MFP 100. Note that the flowchart shown in FIG. 4 is realized by the CPU 101 of the MFP 100 executing a program stored in the ROM 102 of the MFP 100.

Here, the user can use the display/operation portion 108 of the MFP 100 to change settings of various types of functions of the MFP 100, such as LAN settings, facsimile settings, language settings, the administrator password function, paper settings, and print settings, for example.

First, in step S401, the CPU 101 determines whether or not a setting change item for which a setting is to be changed using the display/operation portion 108 is a function that requires password authentication. For example, it is desirable that settings regarding the entire apparatus, such as LAN settings, facsimile settings, language settings, and the administrator password function, be able to be set only by an administrator, and thus password authentication is required. However, it is desirable that paper settings that are changed each time a user sets paper, print settings that need to be changed with each print, and the like be able to be set by all users rather than only the administrator, and thus password authentication is not needed.

In the case where the determination indicates that the setting change item is not a function that requires password authentication (NO in S401), the procedure advances to step S406. On the other hand, in the case where the setting change item is a function that requires password authentication (YES in S401), the CPU 101 determines, in step S402, whether or not the administrator password function stored in the RAM 103 is enabled. If the administrator password function is disabled (NO in S402), the procedure advances to step S406. On the other hand, if the administrator password function is enabled (YES in S402), the CPU 101 determines, in step S403, whether or not the setting of a password coverage range stored in the RAM 103 includes a local function. In this context, "password coverage range" refers to the setting indicating where (a requestor of the setting request) the password authentication is to be applied, and any one of three items, namely "local function", "remote function", and "local function/remote function", is set for the password coverage range. Details will be given later with reference to FIG. 6.

In the case where the setting of the password coverage range is "remote function" and does not include "local function" (NO in S403), the procedure advances to step S406. On the other hand, in the case where the setting of the password coverage range is "local function" or "local function/remote function", which includes "local function" (YES in S403), the procedure advances to step S404. In step S404, the CPU 101 displays a password input screen in the display/operation portion 108 and prompts a user to input a password. In step S405, the CPU 101 uses the authentication determination portion 117 to determines whether or not the input password matches the password stored in the RAM 103. In other words, it is determined whether or not the input password is correct. If the input password is incorrect (NO in S405), the procedure returns to step S404, where the CPU 101 again prompts the user to input a password. On the other hand, if the input password is correct (YES in S405), the authentication is successful, and the CPU 101 executes setting changes for various types of functions in step S406. Note that predetermined processing executed as a result of a successful authentication is not limited to setting changes for the functions, and may instead be the execution of various types of functions (such as printing, reading a document, or the like).

Figure 5:
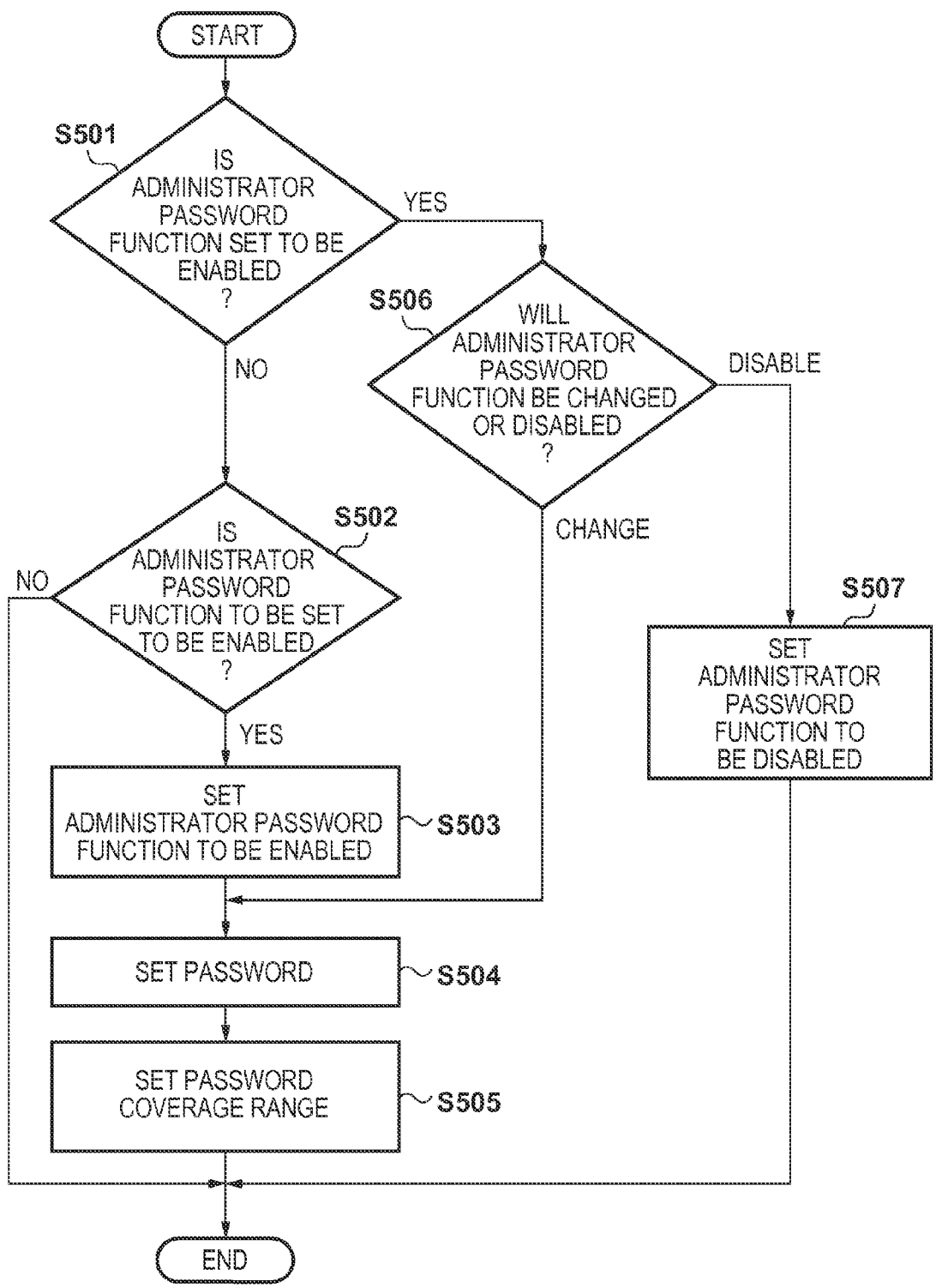
FIG. 5 is a flowchart illustrating operations of the MFP 100 in which settings for an administrator password function are changed using the main body UI of the MFP 100 or a remote UI of the PC 200.

FIG. 5 is a flowchart showing the operation of the MFP 100 in which the setting of the administrator password function is changed through the main body UI of the MFP 100 or the remote UI of the PC 200. Note that the flowchart shown in FIG. 5 is realized by the CPU 101 of the MFP 100 executing a program stored in the ROM 102 of the MFP 100. Here, in the case where the setting change for the administrator password function is made via the main body UI of the MFP 100, the processing of FIG. 5 corresponds to the processing in step S406 in the flowchart of FIG. 4. However, in the case where the setting change for the administrator password function made via the remote UI of the PC 200, the processing of FIG. 5 is executed after the flowchart of FIG. 7 described below.

In the case where setting change of the password function is executed through the local UI, the user makes an instruction using the keys of the display/operation portion 108 on the screen displayed on the monitor of the display/operation portion 108 of the MFP 100.

On the other hand, in the case where the setting change for the password function is executed through the remote UI, the display screen for the user to make an instruction is provided by the MFP 100. That is, by making an instruction through the display screen that is displayed in the display portion 208 of the PC 200 by the MFP 100, the user can cause the MFP 100 to execute the processing shown in FIG. 5.

First, in step S501, the CPU 101 determines whether or not the administrator password function stored in the RAM 103 is set to be enabled. In the case where the administrator password function is set to be enabled (YES in S501), the procedure advances to step S506. Note that the state in which the administrator password function is enabled is a state in which a password is set for one of the "local function" and the "remote function", which will be described later, and the password coverage range includes one of these functions. On the other hand, in the case where the administrator password function is set to be disabled (NO in S501), the CPU 101 determines in step S502 whether or not the administrator password function is to be enabled by displaying a screen for prompting a user to select whether or not to enable the function. Note that the state in which the administrator password function is disabled is a state in which no password is set for both the "local function" and "remote function", which will be described later, and the password coverage range includes none of the functions.

In the case where the user has selected "disabled" (NO in S502), the processing for changing the setting for the administrator password function ends. On the other hand, if the user selects "enable" (YES in S502), the CPU 101 enables, in step S503, the administrator password function with respect to the RAM 103.

In step S504, the CPU 101 displays a setting screen for configuring a password setting and prompts the user to set a password. The CPU 101 stores the set value (password) in the RAM 103. Then, in step S505, the CPU 101 displays a setting screen for configuring a password coverage range setting, and prompts the user to select one of the three options, namely, "local function", "remote function", "local function/remote function", for the password coverage range. Then, the password coverage range selected by the user is set, and the processing for changing the setting for the administrator password function ends. Similarly, the CPU 101 stores the set value (password coverage range) in the RAM 103. Details will be given later with reference to FIG. 6.

Meanwhile, in step S506, because the administrator password function has already been set to be enabled, the CPU 101 displays a screen for prompting the user to select "change" or "disable" for the administrator password function. In the case where the user selects "change", the procedure advances to step S504. On the other hand, if the user selects "disable", the CPU 101 sets, in step S507, the administrator password function to be disabled in the RAM 103, and the processing for changing the setting for the administrator password function ends.

Figure 6:
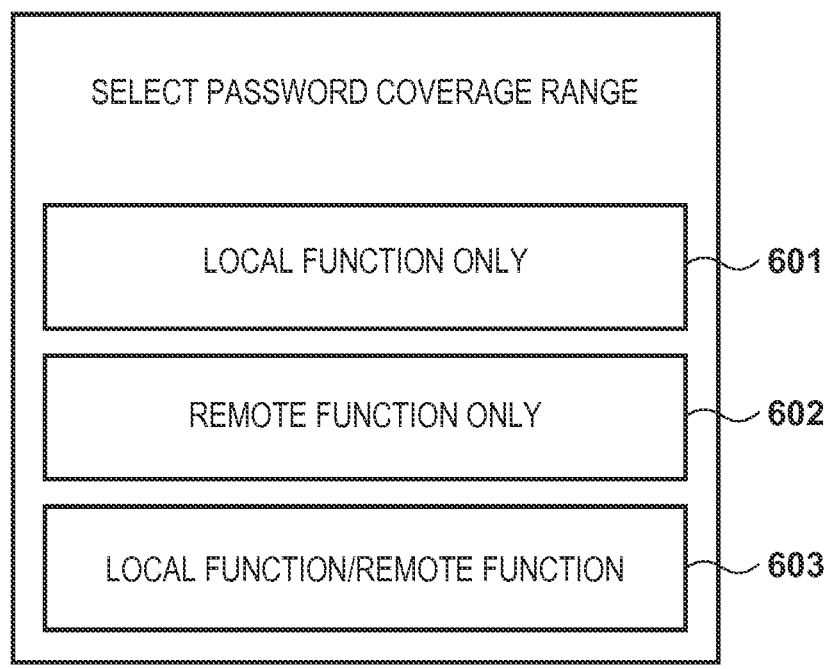
FIG. 6 shows a password coverage range setting screen.

FIG. 6 shows a password coverage range setting screen. This is an example of the password coverage range setting screen in which there are three options for the password coverage range. Note that these options are examples, and depending on the application or purpose, it is also possible for at least one of the three options (the local function, the remote function, and both functions) to be set or for no password coverage range to be set in any case.

"Local function only" (601) is a setting in which password authentication is required only in the case of a setting change made via the main body UI of the MFP 100, or in other words, the local function, in the case where settings of various types of functions are changed. In this case, password authentication is not required in the case of a setting change made via the remote function such as the remote UI or the network tool of the PC 200.

"Remote function only" (602) is a setting in which password authentication is required only in the case of a setting change made via the remote function which may be the remote UI or the network tool of the PC 200, in the case where settings of various types of functions are changed. In this case, password authentication is not required in the case of a setting change made via the main body UI of the MFP 100, or in other words, the local function.

"Local function/remote function" (603) is a setting in which password authentication is required in the case of a setting change made using both the local function, i.e., the main body UI of the MFP 100 and the remote function which may be the remote UI or of the network tool of the PC 200.

As described above, in the setting screen illustrated in FIG. 6, it is possible to set whether or not the local function and the remote function are individually included in the password coverage range, or in other words, whether or not a password input is requested when setting a predetermined function for the MFP 100. Alternatively, the user's options for the password coverage range may be two, namely, "both the local function and the remote function" and "remote function only".

Meanwhile, although there are three options for the password coverage range in FIG. 6, "remote function only" (602) is assumed to be the default setting for the password coverage range (the setting in the initial state). By setting "remote function only" (602), password authentication can be required for access from the remote function which may be the remote UI or the network tool of the PC 200, thus providing a countermeasure to vulnerability. Meanwhile, since no password authentication is required for the main body UI, or in other words, the local function, the usability can be improved for unaccustomed users. Accordingly, security measures can be taken while also improving the usability for users. Furthermore, password authentication is not required when setting up the MFP 100 for the first time, and thus a user does not need to search a manual for a password, making it possible to reduce the setup time.

Note that the password that is set in step S504 of FIG. 5 is used for both the remote function (remote UI) and the local function (MFP main body UI). That is, for example, if in step S505 the user designates the local function/remote function (603) in the screen of FIG. 6 as the password coverage range, the password set in step S504 is applied to both the local function and the remote function.

Therefore, as opposed to a case where, for example, different passwords are set for the local function and the remote function, the number of passwords the user needs to remember can be reduced and the password setting can be carried out at one time. Furthermore, the processing described with reference to FIG. 5 can be executed through both the main body UI and the remote UI, and thus, for example, both the password for the main body UI and the password for the remote UI can be set with a single setting process through the main body UI.

Figure 7:
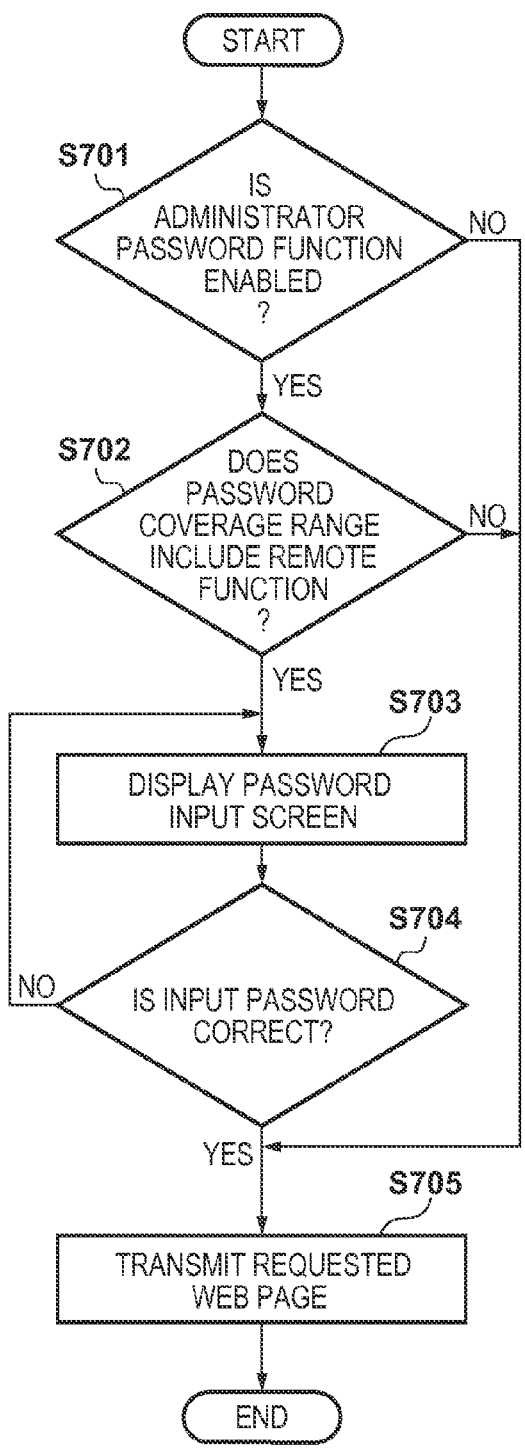
FIG. 7 is a flowchart illustrating operations performed when a web server is accessed from the remote UI of the PC 200.

FIG. 7 is a flowchart illustrating operations of the MFP 100 when a web server is accessed from the remote UI of the PC 200. Note that the flowchart shown in FIG. 7 is realized by the CPU 101 of the MFP 100 executing a program stored in the ROM 102 of the MFP 100. Here, the web browser of the PC 200 can access the web server portion 116 of the MFP 100 to acquire a web page, and can use the remote UI function of the MFP 100.

First, if the web server portion 116 of the MFP 100 is accessed from the web browser of the PC 200, the CPU 101 determines in step S701 whether or not the administrator password function stored in the RAM 103 is enabled. In the case where the administrator password function is disabled (NO in S701), the procedure advances to step S705. On the other hand, in the case where the administrator password function is enabled (YES in S701), the CPU 101 determines, in step S702, whether or not the setting of the password coverage range stored in the RAM 103 includes the remote function.

In the case where the setting of the password coverage range is "local function" and does not include "remote function" (NO in S702), the procedure advances to step S705. On the other hand, in the case where the setting of the password coverage range is "remote function" or "local function/remote function" (YES in S702), the CPU 101 displays, in step S703, a password input screen in the web browser of the PC 200, and prompts the user to input a password. Then, in step S704, the CPU 101 uses the authentication determination portion 117 to determine whether or not the password input via the password input screen matches the password stored in the RAM 103. In other words, it is determined whether or not the input password is correct. In the case where the input password is incorrect (NO in S704), the procedure returns to step S703, where the user is again prompted to input a password. On the other hand, in the case where the input password is correct (YES in S704), the CPU 101 transmits, in step S705, a web page requested by the web server portion 116 from the web browser of the PC 200.

Then, the Web browser of the PC 200 displays the received web page, and the user can perform setting changes for various types of functions, make an instruction regarding the operation of the MFP 100, using the remote UI function. In the case where the setting change of the administrator password function is executed, after step S705, the setting change for the administrator password function is selected in the remote UI and the above-described processing of FIG. 5 is executed. In the case where the web browser stores the password input result in step S704, it is possible to eliminate the need for the user to again input the password in the same session. Meanwhile, the procedure from steps S701 to S704 need not be performed with respect to all accesses to the web server portion 116 of the MFP 100 from the web browser of the PC 200. For example, the procedure in FIG. 7 is executed in the case where password authentication is required, such as when a web page for one of various types of settings such as LAN settings or the setting of the administrator password function is requested. On the other hand, the procedure from steps S701 to S704 is skipped and only the processing in step S705 is executed when password authentication is not required, such as a case where information is merely displayed, for example, when a web page for displaying the state of the MFP 100 such as ink information is requested.

As described above, according to Embodiment 1, by setting the password coverage range, it is possible to decide for which of the local function and the remote function password authentication is to be executed. Furthermore, security measures can be taken while also improving the usability for users. Meanwhile, in the initial state of the MFP 100, setting only the remote function as the range in which password authentication is executed eliminates the need for password authentication when first setting up the MFP 100. Thus, a user does not need to search a manual for a password, making it possible to reduce the setup time. Moreover, with respect to an item that can be set through both the main body UI of the MFP 100 and the remote UI of the PC 200, such as the administrator password function described with reference to FIG. 5, changing the setting for the password coverage range makes it possible to permit the setting to be made only from either the main body UI or the remote UI.

Embodiment 2

Figure 8:
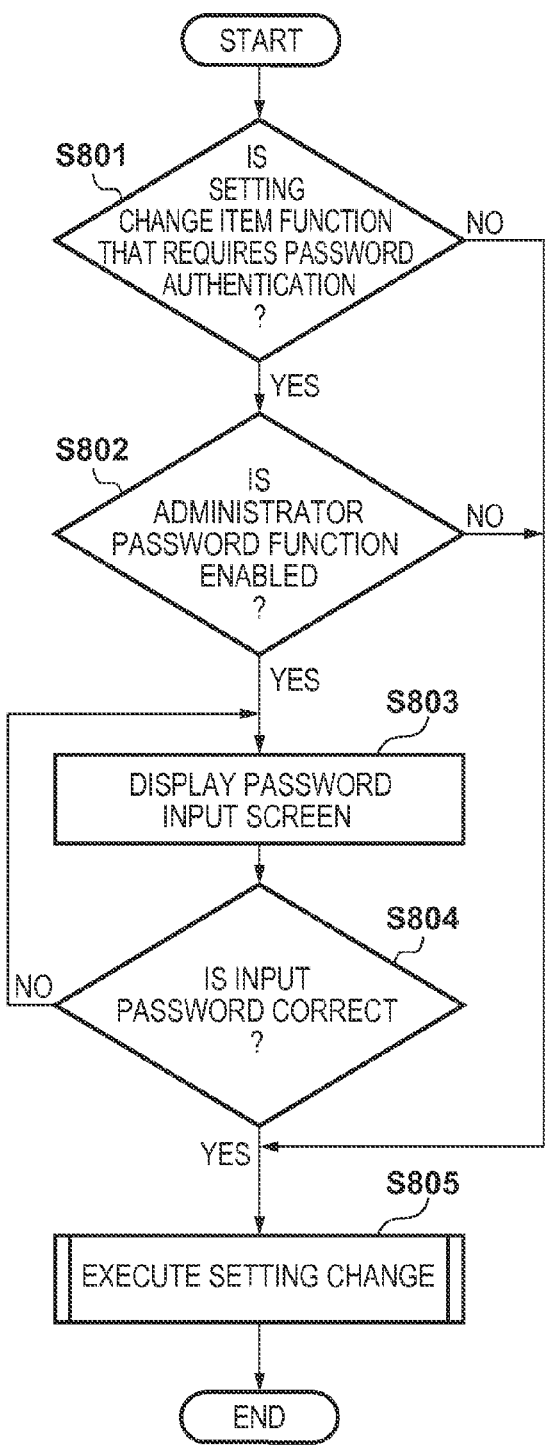
FIG. 8 is a flowchart illustrating operations in which settings for various types of functions are changed using a network tool of the PC 200.

FIG. 8 is a flowchart showing the operations of the MFP 100 and the PC 200 when settings of various types of functions are changed using the network tool of the PC 200. Note that in the flowchart shown in FIG. 8, the processing executed by the MFP 100 is realized by the CPU 101 of the MFP 100 executing the program stored in the ROM 102 of the MFP 100. Furthermore, the processing executed by the PC 200 is realized by the CPU 201 of the PC 200 executing the program that corresponds to the network tool stored in the ROM 202 of the PC 200. Here, the network tool of the PC 200 is one of the remote functions for accessing the MFP 100 over a network and changing the settings for various types of functions of the MFP 100. However, unlike the remote UI function described with reference to FIG. 7, the network tool does not cover the setting of the password coverage range among the administrator password functions. In other words, settings for the password coverage range using the network tool are prohibited from being accepted.

Note that with respect to the remote UI described with reference to FIG. 7, the UI screen is provided to the PC 200 by the MFP 100. On the other hand, the network tool is not provided by the MFP 100, but the program of the network tool is stored in, for example, a storage medium, such as an external web server or a CD-ROM. Also, the network tool is installed in the PC 200 by being downloaded from the web server or by the CD-ROM or the like being loaded into the PC 200.

In the case where a setting change is performed using the network tool of the PC 200, first, in step S801, the CPU 201 makes an inquiry to the MFP 100 using the network tool of the PC 200 so as to determine whether or not the setting change item is a function that requires password authentication. In the case where the result of the determination indicates that the setting change item is not a function that requires password authentication (NO in S801), the procedure advances to step S805. On the other hand, in the case where the setting change item is a function that requires password authentication (YES in S801), the CPU 201 makes, in step S802, an inquiry to the MFP 100 using the network tool of the PC 200 so as to determine whether or not the administrator password function stored in the RAM 103 is enabled. In the case where the administrator password function is disabled (NO in S802), the procedure advances to step S805. On the other hand, in the case where the administrator password function is enabled (YES in S802), the CPU 201 displays, in step S803, a password input screen in the network tool of the PC 200 and prompts the user to input a password.

In step S804, the CPU 201 makes an inquiry to the MFP 100 using the network tool of the PC 200, and uses the authentication determination portion 117 to determine whether or not the input password matches the password stored in the RAM 103. In other words, it is determined whether or not the input password is correct. In the case where the input password is incorrect (NO in S804), the procedure returns to step S803, where the CPU 201 again prompts the user to input a password. On the other hand, in the case where the input password is correct (YES in S804), the CPU 101 of the MFP 100 notifies, in step S805, the MFP 100 of the setting change using the network tool of the PC 200, and the MFP 100 executes the setting change of various types of functions.

Figure 9:
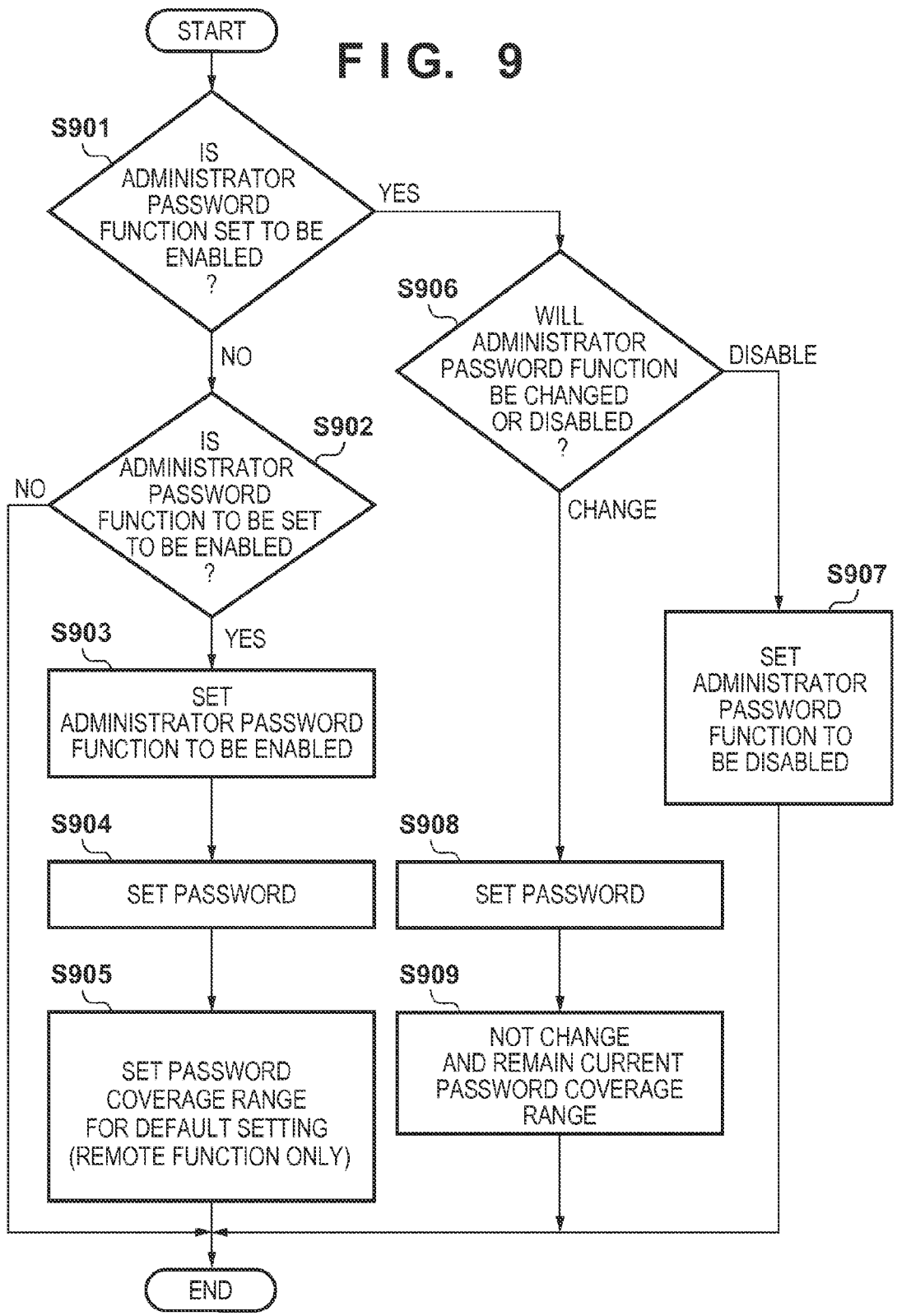
FIG. 9 is a flowchart illustrating operations in which settings for the administrator password function are changed using a network tool of the PC 200.

The following will describe the setting change for the administrator password function as an example of the processing in step S805, with reference to FIG. 9.

FIG. 9 is a flowchart showing the operation of the MFP 100 in which the setting for the administrator password function is changed using the network tool of the PC 200. Not that the flowchart of FIG. 9 is realized by the CPU 101 of the MFP 100 executing a program stored in the ROM 102 of the MFP 100. Here, the processes in steps S901 to S904, S906, and S907 are the same as those in steps S501 to S504, S506, and S507 of FIG. 5, and thus descriptions thereof will be omitted.

In step S905, the CPU 101 changes the administrator password function from disabled to enabled. However, because the password function has been determined in S901 as being disabled and both the local function and the remote function are disabled as the password coverage range, the default password coverage range is set here. The default password coverage range is "remote function only" as described with reference to FIG. 6.

The processing in step S908 is the same as that of step S504 of FIG. 5, and thus descriptions thereof will be omitted. In step S909, because the administrator password function was changed to be enabled and there is information of the password coverage range set for the MFP 100 by the user, the CPU 101 does not change the password coverage range.

As described above, according to Embodiment 2, by using the default setting (default authentication condition) or an existing setting, adaptive authentication can be realized even for a predetermined requestor for which a password coverage range cannot be used, such as the network tool.

Furthermore, because the network tool is not provided by the MFP 100 as described above, there are cases where a user cannot be provided with the password coverage range setting screen (FIG. 6) through the network tool. Even in this case, if the password function is disabled and the password function is to be enabled (NO in S901 and YES in S902), the remote function can be included in the password coverage range in step S905.

Embodiment 3

Figure 10:
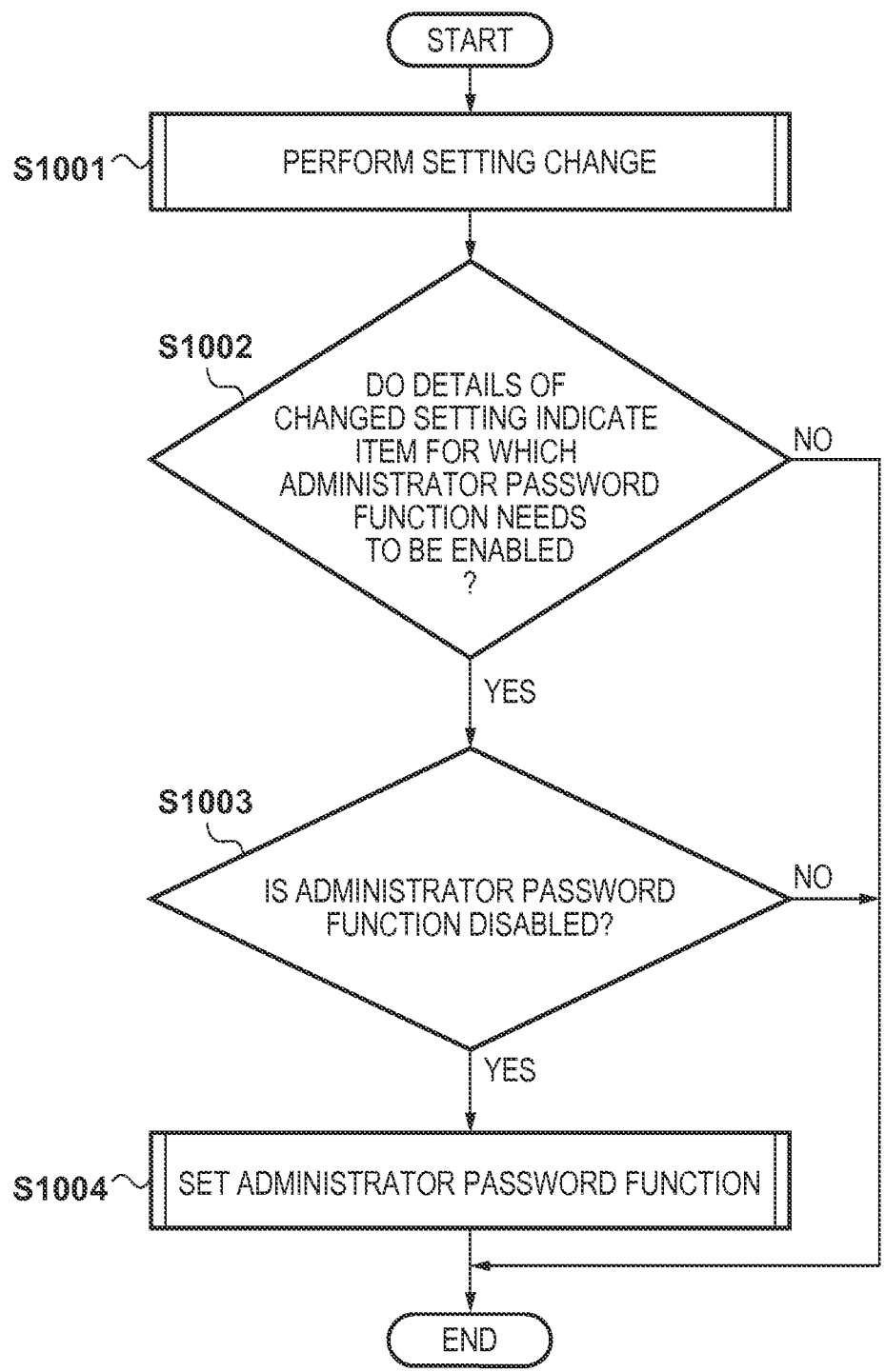
FIG. 10 is a flowchart illustrating subsequent operations in which settings for the administrator password function are made based on the details of a setting change in the MFP 100.

FIG. 10 is a flowchart showing subsequent operations in which the setting for an administrator password function is performed based on the details of the setting change in the MFP 100. Note that the flowchart shown in FIG. 10 is realized by the CPU 101 of the MFP 100 executing a program stored in the ROM 102 of the MFP 100.

First, in step S1001, the CPU 101 executes a setting change. It is assumed that, for example, when the LAN setting is configured, the LAN setting is switched to be enabled from the disabled state through the display/operation portion 108. Alternatively, it is assumed that access restrictions indicating from which IP addresses access is permitted are changed using the remote UI of the PC 200.

Then, in step S1002, the CPU 101 determines whether or not the details of the changed setting indicate an item for which the administrator password function needs to be enabled. In the case where the details do not indicate an item for which the administrator password function needs to be enabled (NO in S1002), the processing ends. On the other hand, in the case where the details indicate an item for which the administrator password function needs to be enabled (YES in S1002), the procedure advances to step S1003. In the case where, for example, the LAN setting is switched to be enabled from the disabled state, the LAN setting is determined to be an item for which the administrator password function needs to be enabled since password authentication should be performed in order to take security measures. Similarly, if the access restrictions are changed, the access restrictions are determined to be an item for which the administrator password function needs to be enabled since password authentication should be performed in order to take security measures.

In step S1003, the CPU 101 determines whether or not the administrator password function is disabled. In the case where the administrator password function is enabled (NO in S1003), the procedure ends since the administrator password function has already been enabled. On the other hand, if the administrator password function is disabled (YES in S1003), the CPU 101 performs, in step S1004, settings for the administrator password function. For example, the processing for changing the setting for the administrator password function described with reference to FIG. 5 is performed. Alternatively, only the processes in steps S503, S504, and S505 of the flowchart of FIG. 5 may be forced to be performed. Furthermore, the following items are conceivable for setting changes that are determined, in step S1002, as items for which the administrator password function needs to be enabled, in addition to the information security measures such as LAN settings or access restrictions. This is the case where personal information such as a telephone number of a facsimile destination or an email address of an email destination is registered in the MFP 100, the case where a password of an SMTP server, which is needed for email transmission, is registered, and the like.

As described above, according to Embodiment 3, subsequently, the setting for the administrator password function is performed based on the details of the setting change (a setting change for a specific setting item). In the case where, for example, the details of setting change are details for which setting of a password is recommended, a setting screen for the password function is automatically displayed. Accordingly, it is possible to ensure the setting for the administrator password function is made.

Embodiment 4

In the foregoing embodiments, a single password coverage range is set for the MFP 100 as a whole, but the present invention is not limited thereto. For example, the password coverage range may be set for each setting item that can be set in the MFP 100. Accordingly, it is possible to perform control such that password authentication is performed for accesses from both the local function and the remote function with respect to the LAN setting but password authentication is performed only for an access from the local function with respect to the facsimile setting.

Alternatively, the password coverage range may be set for each function that can be executed by the MFP 100. Accordingly, the following setting is possible. For example, when reading a document, a password input is not requested for the local function but password input is requested for the remote function. Meanwhile, when printing, password input is requested for both the remote function and the local function.

Furthermore, in the foregoing embodiments, various types of settings of the MFP 100 can be made from both the local function and the remote function, but the present invention is not limited thereto. For example, information on the requestor of the LAN setting, or in other words, information indicating from which of the local function and the remote function the LAN setting is requested, is managed by the RAM 103, and only access from the set place (requestor) may be permitted. In this case, based on the password coverage range, password authentication is required for an access from the set place, and an error is returned for an access from an unset place. By performing such control, changes can only be made from either the local function or the remote function, which enhances the security.

Furthermore, although the authentication determination portion 117 uses password authentication as an authentication method, the present invention is not limited thereto. Another authentication method may be used depending on the application or purpose. For example, a biometric authentication device may be installed in an apparatus and an authentication method using biometric authentication (using a voice signature, a fingerprint, iris, audio, or the like) may be used. In this case, the password coverage range will function as an authentication condition for requiring authentication, and, for example, authentication can be required only for an access from the remote function.

Note that the functions of the foregoing embodiments may be realized by the following configurations. That is, the functions may be achieved by program code for executing the processing of the embodiments being provided to a system or an apparatus, and a computer (or a CPU or MPU) of the system or the apparatus executing the program code. In this case, the program code itself that read out from a storage medium will realize the functions of the foregoing embodiments, and the storage medium in which the program code is stored will also realize the functions of the embodiments.

Furthermore, the program code for realizing the functions of the embodiments may be executed by a single computer (CPU or MPU) or a plurality of computers cooperating with each other. Furthermore, the program code may be executed by a computer, or hardware such as a circuit for realizing the functions of the program code may be provided. Moreover, part of the program code may be realized by hardware and the remaining part may be realized by a computer.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-138018, filed Jul. 3, 2014, which is hereby incorporated by reference herein in its entirety.

What is claimed is:

1. A processing apparatus that performs predetermined processing, the processing apparatus comprising:
a memory storing a program; and
a processor that executes the program stored in the memory to act as units, the units comprising:
an authentication unit configured to authenticate, in response to a request for performing the predetermined processing, a requestor that made the request,
a performing unit configured to perform the predetermined processing upon the authentication performed by the authentication unit succeeding, and
a setting unit configured to display a screen in which each of a first setting and a second setting can be performed individually and to individually perform, the first setting and the second setting in accordance with an instruction by a user on the displayed screen, (i) the first setting being for setting whether or not the authentication unit is to perform authentication on the processing apparatus and (ii) the second setting being for setting whether or not the authentication unit is to perform authentication on an external apparatus of the processing apparatus,
wherein in a case where the requestor is the processing apparatus, the authentication unit performs authentication in accordance with the setting unit setting the authentication to be performed on the processing apparatus in the first setting, and
wherein in a case where the requestor is the external apparatus, the authentication unit performs authentication in accordance with the setting unit setting the authentication to be performed on the external apparatus in the second setting.

2. The processing apparatus according to claim 1, wherein the predetermined processing is a setting regarding a function that can be performed by the processing apparatus.

3. The processing apparatus according to claim 1, wherein the processor further executes the program stored in the memory to act as:
a storage unit configured to store the first setting and the second setting, which are used for determination of performing the authentication and which can be made by the setting unit,
wherein, in an initial state before the second setting has been made by the setting unit, the storage unit has stored therein a setting to perform authentication when the requestor is the external apparatus.

4. The processing apparatus according to claim 1, wherein the processor further executes the program stored in the memory to act as:
an acceptance unit configured to accept a request for changing a function setting made by the setting unit,
wherein in a case where a requestor that made the request for changing the function setting accepted by the acceptance unit is a predetermined requestor, the setting unit does not change the function setting for the processing apparatus.

5. The processing apparatus according to claim 1, wherein the setting unit displays the screen in a case where the request for performing the predetermined processing is for a specific setting item and authentication is set not to be performed on the requestor that made the request.

6. The processing apparatus according to claim 1, wherein the setting unit sets an authentication condition for each of items in the predetermined processing.

7. The processing apparatus according to claim 1, wherein the processor further executes the program stored in the memory to act as:
a management unit configured to manage the requestor that made the request for performing the predetermined processing,
wherein the authentication unit applies the first setting or the second setting by the setting unit in a case where the requestor that made the request for performing the predetermined processing is a first requestor managed by the management unit, and wherein the predetermined processing is not permitted in a case where the requestor that made the request for performing the predetermined processing is a second requestor which is not managed by the management unit.

8. The processing apparatus according to claim 1, wherein the authentication performed by the authentication unit is password authentication.

9. The processing apparatus according to claim 1, wherein the setting unit is capable of performing each of the first setting and the second setting regardless of whether the instruction is a user instruction to the processing apparatus or a user instruction to the external apparatus.

10. The processing apparatus according to claim 1, wherein the setting unit sets a password which is used commonly by both the processing apparatus and the external apparatus, for which the authentication unit is to perform the authentication, and
    wherein the authentication unit performs the authentication using the password in a case where the setting unit has set the authentication to be performed in the first setting and in a case where the setting unit has set the authentication to be performed in the second setting.

11. The processing apparatus according to claim 1, wherein the external apparatus is an apparatus which made the request via a web page provided by the processing apparatus.

12. The processing apparatus according to claim 4, wherein the setting unit does not change the function setting for the processing apparatus, in a case where an external apparatus made the request using a predetermined software as the predetermined requester, and
    wherein the setting unit changes the function setting for the processing apparatus, in a case where the external apparatus made the request via a web page provided by the processing apparatus.

13. The processing apparatus according to claim 2, wherein the setting regarding the function can be changed by any of the processing apparatus and the external apparatus.

14. The processing apparatus according to claim 2, wherein the setting regarding the function includes a network setting.

15. The processing apparatus according to claim 1, wherein the predetermined processing includes the first setting and the second setting by the setting unit.

16. The processing apparatus according to claim 1, wherein the processor further executes the program stored in the memory to act as units comprising a printing unit configured to print an image.

17. The processing apparatus according to claim 16, wherein the predetermined processing does not include a paper setting about a paper used for printing by the printing unit, and the paper setting is permitted regardless of the settings performed by the setting unit.

18. The processing apparatus according to claim 5, wherein the specific setting item is an item relating to personal information.

19. A method for controlling a processing apparatus that performs predetermined processing, the method comprising:
    a setting step of displaying a screen in which each of a first setting and a second setting can be performed individually, and individually performing the first setting and the second setting in accordance with an instruction by a user on the displayed screen, (i) the first setting being for setting whether or not to perform authentication on the processing apparatus and (ii) the second setting being for setting whether or not to perform authentication on an external apparatus of the processing apparatus;
    an authentication step of (a) in a case where a requestor who made the request is the processing apparatus, authenticating the processing apparatus in accordance with the first setting to perform authentication on the processing apparatus in the first setting, and (b) in a case where the requestor is the external apparatus, authenticating the processing apparatus in accordance with the second setting to perform authentication on the external apparatus in the second setting; and
    a performing step of performing the predetermined processing upon the authentication of the authentication step succeeding.

20. A non-transitory computer-readable storage medium that has stored therein a program for causing a computer to function as units of a processing apparatus that performs predetermined processing, the units comprising:
    an authentication unit configured to authenticate, in response to a request for performing the predetermined processing, a requestor that made the request;
    a performing unit configured to perform the predetermined processing upon the authentication performed by the authentication unit succeeding; and
    a setting unit configured to display a screen in which each of a first setting and a second setting can be performed individually, and to individually perform the first setting and the second setting in accordance with an instruction by a user on the displayed screen, (i) the first setting being for setting whether or not the authentication unit is to perform authentication on the processing apparatus and (ii) the second setting being for setting whether or not the authentication unit is to perform authentication on an external apparatus of the processing apparatus,
    wherein in a case where the requestor is the processing apparatus, the authentication unit performs the authentication in accordance with the setting unit setting authentication to be performed on the processing apparatus in the first setting, and
    wherein in a case where the requestor is the external apparatus, the authentication unit performs the authentication in accordance with the setting unit setting authentication to be performed on the external apparatus in the second setting.

* * * * *